(12) United States Patent
Koshta et al.

(10) Patent No.: US 11,889,584 B2
(45) Date of Patent: Jan. 30, 2024

(54) UPDATING USER EQUIPMENT PARAMETERS

(71) Applicant: Apple Inc., Cupertino, CA (US)

(72) Inventors: Nirlesh Koshta, Bengaluru (IN); Krisztian Kiss, Hayward, CA (US); Pradeep Pangi, Bengaluru (IN); Sridhar Prakasam, Freemont, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 17/443,196

(22) Filed: Jul. 22, 2021

(65) Prior Publication Data

US 2022/0053316 A1 Feb. 17, 2022

(30) Foreign Application Priority Data

Aug. 12, 2020 (IN) .............................. 202041034619

(51) Int. Cl.
*H04W 8/18* (2009.01)
*H04W 12/069* (2021.01)

(52) U.S. Cl.
CPC ........... *H04W 8/18* (2013.01); *H04W 12/069* (2021.01)

(58) Field of Classification Search
CPC ... G06F 7/46; G06F 7/498; G06F 8/65; G06F 8/658; G06F 16/23; G06F 21/57; G06F 9/4451; G06Q 50/30; H04W 8/18; H04W 12/069; H04W 8/20; H04W 48/16; H04W 24/02; H04W 40/02; H04W 8/00; H04W 8/02; H04W 8/04; H04W 8/06; H04W 8/08; H04W 8/082; H04W 88/00; H04W 88/02; H04W 88/08; H04W 88/18; H04W 40/24; H04W 40/248; H04W 12/08; H04W 4/50; H04L 1/1607; H04L 41/0813; H04M 15/8038; H04M 2215/34; H04M 2215/7442

See application file for complete search history.

(56) References Cited

U.S. PATENT DOCUMENTS

| 10,979,886 B2* | 4/2021 | Lanev et al. ............. H04W 8/02 |
| 2015/0270975 A1* | 9/2015 | Buckley et al. ....... H04L 9/3247 |
| 2018/0210667 A1* | 7/2018 | Matsumura ........... G06F 3/0619 |

(Continued)

FOREIGN PATENT DOCUMENTS

| KR | 20100114560 | 10/2010 |
| WO | 2012/065405 | 5/2012 |

OTHER PUBLICATIONS

CAG Information Processing Method, Terminal, Network Element and USIM; CN 113727326 A (Year: 1120).*

(Continued)

*Primary Examiner* — Meless N Zewdu
(74) *Attorney, Agent, or Firm* — Fay Kaplun & Marcin, LLP (57) ABSTRACT

A user equipment (UE) may perform a UE parameter update (UPU) procedure or a steering of roaming (SoR) procedure based on information received from a home public land mobile network (HPLMN). The UE receives, from a network component, an update container comprising updated parameters for the UE and a counter value associated with the update container, compares the counter value with a stored value and performs an action related to the update container based on at least the comparison of the counter value with the stored value.

18 Claims, 7 Drawing Sheets

(56) References Cited

U.S. PATENT DOCUMENTS

2018/0260155 A1* 9/2018 Cherian et al. ....... G06F 3/0647
2020/0145915 A1* 5/2020 Kumar et al. ........ H04W 48/18

OTHER PUBLICATIONS

NEC, "Security mechanism for UE Parameters Update via UDM Control Plane Procedure", 3GPP SA WG3, S3-183624, Nov. 12, 2018, 8 sheets.

"3$^{rd}$ Generation Partnership Project; Technical Specification Group Services and System Aspects; Procedures for the 5G System (5GS); Stage 2 (Release 16)", Aug. 6, 2020.

* cited by examiner

UPDATING USER EQUIPMENT PARAMETERS

BACKGROUND 5G new radio (NR) wireless communications support updates to user equipment (UE) parameters by a home PLMN (HPLMN). The HPLMN updates parameters based on the policies of the network provider. For example, according to current 3GPP standards, parameters such as the updated default configured network slice selection assistance information (NSSAI), the updated routing ID data, and/or the steering of roaming (SoR) list may be updated on the UE by the HPLMN. However, there are scenarios where the UE parameters may not be updated in the correct manner.

SUMMARY

Some exemplary embodiments are related to a user equipment (UE) having a transceiver and one or more processors communicatively coupled to the transceiver. The one or more processors are configured to perform operations. The operations include receiving, from a network component, an update container comprising updated parameters for the UE and a counter value associated with the update container, comparing the counter value with a stored value and performing an action related to the update container based on at least the comparison of the counter value with the stored value.

Other exemplary embodiments are related to a baseband processor that is configured to perform operations. The operations include receiving, from a network component, an update container comprising updated parameters for a user equipment (UE) and a counter value associated with the update container, comparing the counter value with a stored value and performing an action related to the update container based on at least the comparison of the counter value with the stored value.

Still further exemplary embodiments are related to a network component implementing a unified data management (UDM) function of a core network. The network component includes one or more processors configured to perform operations. The operations include determining that an old routing indicator being used by a user equipment (UE) should be updated to a new routing indicator, wherein the old routing indicator is associated with an old unified data management (UDM) instance and an old authentication server function (AUSF) instance and the new routing indicator is associated with a new UDM instance and a new AUSF instance, protecting the new routing indicator, wherein protecting the new routing indicator includes determining a UE parameter update (UPU) counter based on an AUSF key, granting access to UE subscription information to the new UDM instance and the new AUSF instance by the old UDM instance and the old AUSF instance, sending a transmission including the new routing indicator and an acknowledgement (ACK) request indicator to an access and mobility management function (AMF) of a core network and forwarding the transmission to the UE.

DETAILED DESCRIPTION

The exemplary embodiments may be further understood with reference to the following description and the related appended drawings, wherein like elements are provided with the same reference numerals. The exemplary embodiments describe manners for a 5G new radio (NR) network to update parameters of a user equipment (UE).

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, a home public land mobile network (HPLMN) may need to update parameters for a UE. Current 3GPP standards provide a method for performing a UE parameter update (UPU) to update parameters such as, for example, the updated default configured network slice selection assistance information (NSSAI), the updated routing ID data, and/or the steering of roaming (SoR) list by the HPLMN. However, current standards do not address the inability of the network to reach the UE or the UE's inability to send an acknowledgement (ACK) back to the network due to, for example, a radio link failure (RLF) event. Another undesirable scenario which may also arise and is not addressed by the current standards is when the UE encounters a tracking area (TA) change to a TA outside of the registration area during a UPU procedure, which would require the initiation of a registration request procedure.

If a routing indicator change is not handled correctly by the unified data management (UDM) of the network and the UE, then the UE may use an old routing indicator in a subscription concealed identifier (SUCI) that is sent to the access and mobility management function (AMF) of the network. Since the network considers the new routing indicator (provided in a UPU procedure) as the valid routing indicator, service to the UE may be denied since the AMF may not be able to select the correct authentication server function (AUSF) and UDM instance required to fetch the UE's subscription information relating to the authentication procedure (e.g., a private key or home network private key), subscribed slice information, or other important parameters relating to the UE's subscription information. If the default configured NSSAI is not correctly updated in the UE, then the UE may continue using the old default configured NSSAI and will not receive service on the newly configured single NSSAIs.

According to some exemplary embodiments, the UPU procedure may include utilization of a timer to track completion of the UPU procure if an ACK from the UE is requested by the UDM. In these exemplary embodiments, the UDM will retransmit the UPU container, which includes the updated routing indicator and/or the updated default NSSAI.

According to other exemplary embodiments, the UPU procedure may request that the AMF to notify the UDM of a communication failure if the AMF cannot reach the UE. In these exemplary embodiments, the UDM requests that the AMF notifies the UDM of any subsequent UE connectivity state changes so that the UDM can re-initiate the UPU procedure.

According to further exemplary embodiments, the UPU procedure for a routing indicator change may alternatively grant access to the UE subscription information to both the new and old UDM and AUSF instances. If the AMF subsequently contacts the new UDM instance for UE context information, the UE subscription information is deleted from the old UDM and AUSF instances. If, however, the AMF contacts the old UDM instance for UE context information, then the old UDM resends the UPU container, which includes the routing indicator change.

Another issue with current 3GPP standards' inability to address failure of a SoR list update procedure is that the UE may not be updated with a preferred PLMN along with the access technologies list provided by the home network. As such, the UE may experience less desirable conditions while roaming and the network provider may incur additional fees.

According to some exemplary embodiments, the SoR list update procedure may include utilization of a timer to track completion of the SoR list update procure if an ACK from the UE is request by the UDM. In these exemplary embodiments, the UDM will retransmit the SoR container, which includes the updated PLMN list.

According to some exemplary embodiments, the SoR list update procedure may request the AMF to notify the UDM of a communication failure if the AMF cannot reach the UE. In these exemplary embodiments, the UDM requests that the AMF notifies the UDM of any subsequent UE connectivity state changes so that the UDM can re-initiate the SoR list update procedure.

Figure 1:
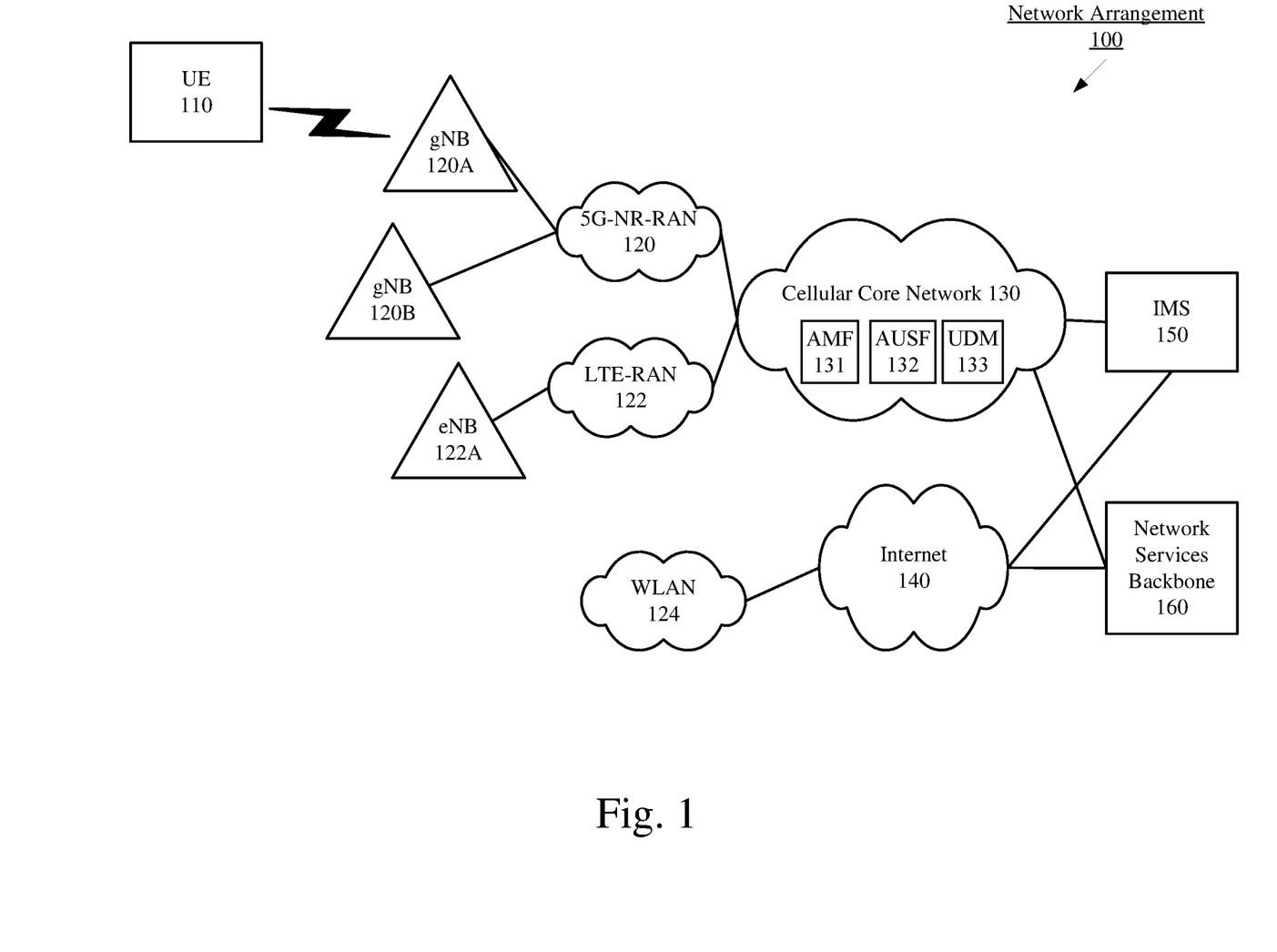
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 also manages the traffic that flows between the cellular network and the Internet 140. The cellular core network 130 may be considered to be the interconnected set of components that manages the operation and traffic of the cellular network. In this example, the components include an access and mobility management function (AMF) 131, an authentication server function (AUSF) 132, and a unified data management (UDM) 133. However, an actual cellular core network may include various other components performing any of a variety of different functions.

The AMF 131 performs operations related to mobility management such as, but not limited to, paging, non-access stratum (NAS) management and registration procedure management between the UE 110 and the cellular core network 130. Reference to a single AMF 131 is merely for illustrative purposes, an actual network arrangement may include any appropriate number of AMFs.

The AUSF 132 is responsible for the UE authentication. The AUSF determines if the UE is authorized to use the services provided by the home/serving network. The AUSF 132 fetches information from the UDM 133 on which authentication of the UE is performed. The AUSF 132 also provides integrity protection service to the UDM 133 when it sends the UPU container or the SoR container to UE. This is used so that both the UE and network can determine that the messages are not tampered with by the serving network.

In the case of sending the UPU container, the AUSF 132 sends a UPU-MAC-IAUSF and CounterUPU. A UPU-XMAC-IUE is sent if the UDM 133 sends an ACK indication to the AUSF 132. In the case of sending the SoR container, the AUSF 132 sends a SoR-MAC-IAUSF and CounterSOR. A SOR-XMAC-IUE is sent if the UDM 133 sends an ACK indication to the AUSF 132. Each of these operations will be described in greater detail below. In summary, the AUSF 132 sends parameters to the UDM 133 that are used to integrity protect the UPU data or SoR data that the UDM 133 sends to UE.

The UDM 133 may handle subscription-related information to support handling of communication sessions and may store subscription data of the UE 110. For example, subscription data may be communicated between the UDM 133 and the AMF 131. The UDM may include a front end (FE), which is responsible for processing credentials, location management, subscription management, etc. Several different front ends may serve the same user in different transactions. The UDM-FE accesses subscription information stored in a unified data repository (not shown) and performs authentication credential processing, user identification handling, access authorization, registration/mobility management, and subscription management.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
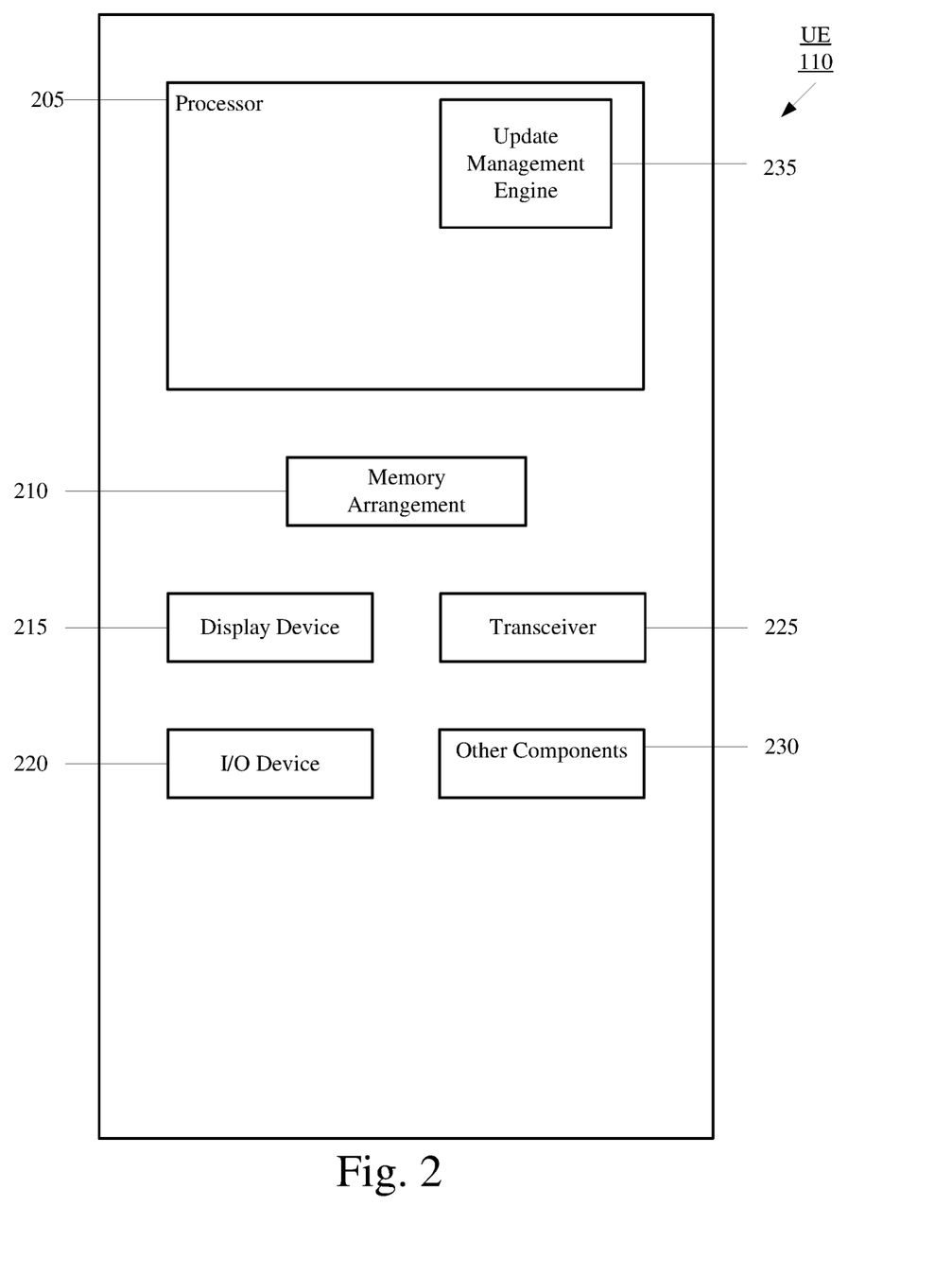
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. For purposes of this discussion, the UE 110 may be considered to be a reduced capability (RedCap) UE. However, it should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an update management engine 235. As will be described in more detail below, the update management engine 235 may perform various operations related to an update procedure such as, for example, processing a UPU or SoR container received from the network and applying the updates in the container or updating the universal subscriber identity module (USIM) elementary files (EF)s.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
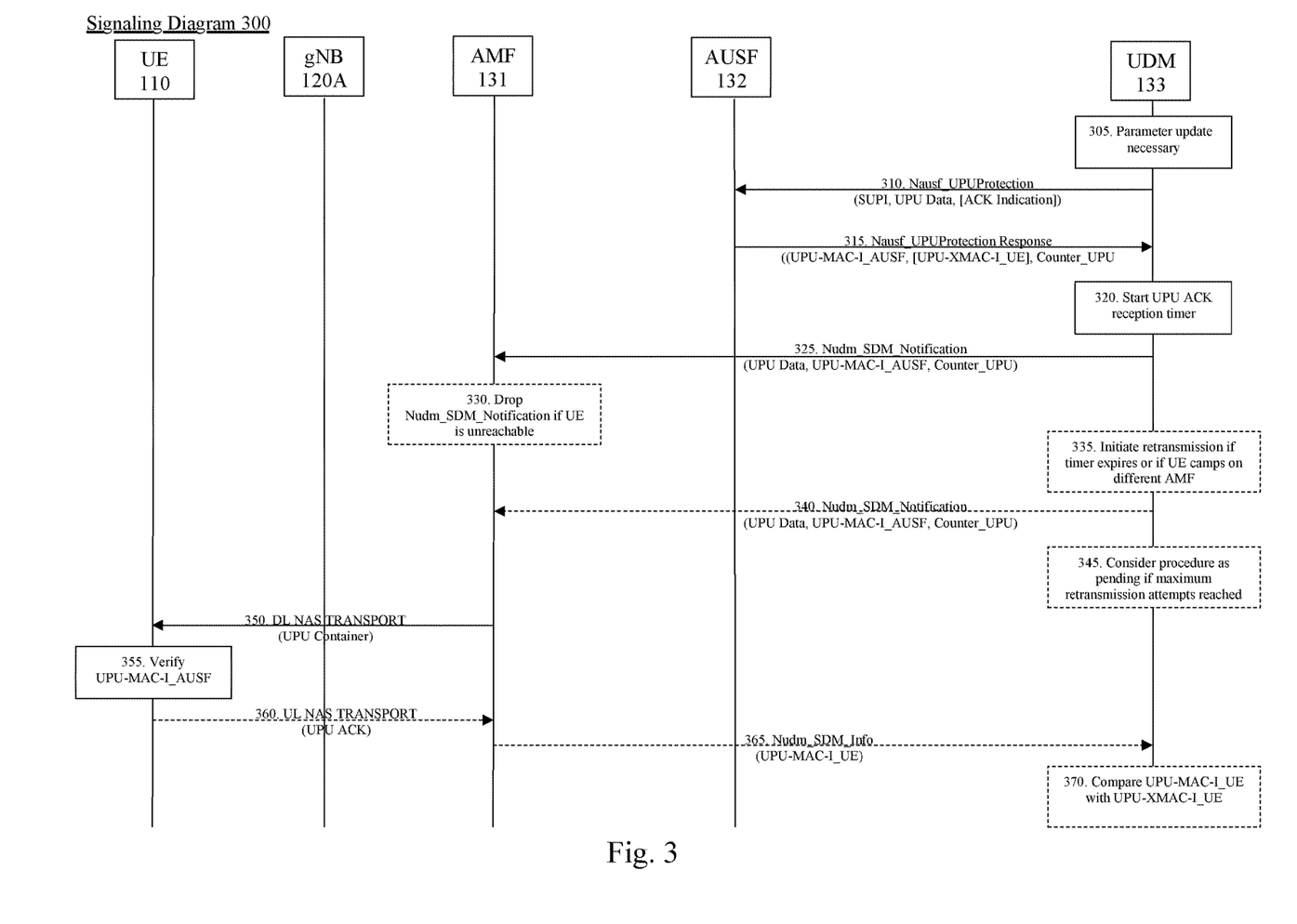
FIG. 3 is a signaling diagram illustrating a UE parameters update (UPU) procedure according to various exemplary embodiments.

FIG. 3 is a signaling diagram 300 illustrating a update procedure according to various exemplary embodiments. At 305, the UDM 133 determines that one or more parameters of the UE 110 should be updated. In some embodiments, the one or more parameters may be an updated routing indicator and/or an updated default configured NSSAI. The routing indicator indicates to the UE 110 that the UE should switch to a new UDM instance and a new AMF instance. At 310, the UDM sends the UPU data (e.g., the updated routing indicator and/or the updated default configured NSSAI) to the AUSF 132 along with the subscription permanent identifier (SUPI) and an indication of whether or not an acknowledgement (ACK) is requested from the UE 110. For purposes of this description, it will be assumed that the UDM 133 is requesting an ACK. However, it should be noted that in some embodiments, an ACK is not necessary. At 315, the AUSF 132 transmits a response to the UDM 133 containing the UPU-MAC-I_AUSF, the UPU-XMAC-I_UE, and the Counter_UPU.

At 320, the UDM 133 starts a timer to track reception of the UPU ACK. If the timer expires before the UDM 133 receives the ACK, then the UDM 133 reattempts the UPU procedure. In some embodiments, if the UDM 133 detects a change of AMF (e.g., the UE 110 initiates a registration request on a new AMF) while the UPU procedure is ongoing, then the UDM 133 can initiate the UPU procedure after the AMF 131 notifies the UDM 133 of the updated location for the UE 110. However, if the AMF contacts the new UDM instance, the UPU procedure is considered completed because the UE 110 has already successfully migrated over to the new UDM instance.

At 325, the UDM 133 notifies the AMF 131 of the changes to the parameters by the means of the Nudm_SDM_Notification. This operation includes the updated parameters as well as an indication of whether or not the UE 110 should send an ACK. If the AMF 131 is unable to communicate with the UE 110, then, at 330, the AMF 131 drops the Nudm_SDM_Notification. If, at 335, the UDM 133 determines that the timer has expired or that the UE 110 has camped on a new AMF, then, at 340, the UDM 133 initiates a retransmission of the UPU container (Nudm_SDM_Notification). If, at 345, the UDM 133 determines that the number of retransmissions is equal to a predetermined maximum number of retransmissions and an ACK has not been received from the UE 110, then the UDM 133 treats the routing indicator update and/or the default configured NSSAI update as pending. In such a scenario, the network treats the old routing indicator as active until the AMF 131 contacts the UDM 133 again. In the case of the default configured NSSAI, the UDM 133 will wait for the AMF 131 to update the location of the UE 110.

If the AMF 131 is able to communicate with the UE 110, however, the AMF 131 sends a DL NAS TRANSPORT message containing the UPU container to the UE 110 at 350. It should be noted that this message may be sent following 325 (the original transmission of the UPU container) or 340 (a retransmission of the UPU container) if the AMF 131 is able to communicate with the UE 110.

At 355, the UE 110 compares the received Counter_UPU to the stored value in the UE 110. If the value is the same and an ACK is requested, the UE 110 sends an ACK at 360 to the network after integrity protecting the ACK as per the 3GPP specifications and including the UPU-MAC-IUE in the UL NAS TRANSPORT. No further processing of the UPU container will take place. If the value is the same and an ACK is not requested, the UE 110 does not process the UPU container further without sending an ACK.

If the received Counter_UPU is different and of a higher value than the one maintained at UE 110, then the UE 110 will process the UPU container as per the 3GPP specifications. For example, the UE 110 will compute the UPU-MAC-IAUSF and this is compared with the received UPU-MAC-IAUSF from network. If it is same, then it further goes ahead with processing the UPU container and sends an ACK, if requested, at 360.

At 365, the AMF 131 transmits a Nudm_SDM_Info message containing the UPU-MAC-I_UE to the UDM 133. At 370, the UDM 133 compares the UPU-MAC-I_UE received from the AMF 131 at 365 with the UPU-XMAC-I_UE received from the AUSF 132 at 315. If the UPU-MAC-I_UE and the UPU-XMAC-I_UE are the same, then the UDM 133 treats the UPU procedure as successfully completed.

If, after verifying the UPU-MAC-I_AUSF at 355, the UE 110 is unable to transmit the ACK due to, for example, a RLF, the UDM 133 is unaware if the UE 110 received the UPU container and/or successfully processed the UPU. In some embodiments, the UDM 133 initiates a retransmission of the UPU container (Nudm_SDM_Notification) as described above at 335. If, however, the maximum number of retransmissions has been reached and the UPU procedure was triggered only for a routing indicator change, then the UDM 133 keeps the UE subscription context in the old UDM instance (133) and the new UDM instance. The purpose of this functionality is that, from the perspective of the UDM 133, not receiving the ACK may mean that the UE 110 never received the UPU container or that the UE 110 received and successfully processed the UPU container but could not send the ACK. Thus, it is advantageous to keep the UE subscription context in both the old and new UDM instances in case the ACK is not received. If the maximum number of retransmissions has been reached and the UPU includes default slice configuration changes, there is no change in the UDM instance and the specific UDM instance tracks whether the UE 110 has received the UPU container. If, however, the UPU container is received and processed by the UE 110 and the UE 110 subsequently receives a retransmission of the UPU container having the same Counter_UPU, the UE 110 may send the ACK, as described above, without processing the UPU container of the retransmission.

In some embodiments, if in between the retransmissions (340) or after it is determined that the UE 110 is not reachable, an AMF 131 contacts the old UDM instance to fetch the UE subscription context, then the UDM 133 may reinitiate the routing indicator change procedure after completion of the registration procedure. In some embodiments, if in between the retransmissions (340) or after it is determined that the UE 110 is not reachable, an AMF 131 contacts the new UDM instance to fetch the UE subscription context, then the new UDM can trigger deletion of the UE subscription context from the old UDM (133) and consider the UPU update procedure as successfully completed. In some embodiments, if UDM 133 is notified by the AMF 131 of a change in the location of the UE 110 (Nudm_UECM_Registration) and the registration procedure is successful, then UDM 133 instance stops any retransmissions of UPU container (340) and utilizes a new AUSF key (K_AUSF) and a new Counter_UPU to generate a new UPU container.

Figure 4:
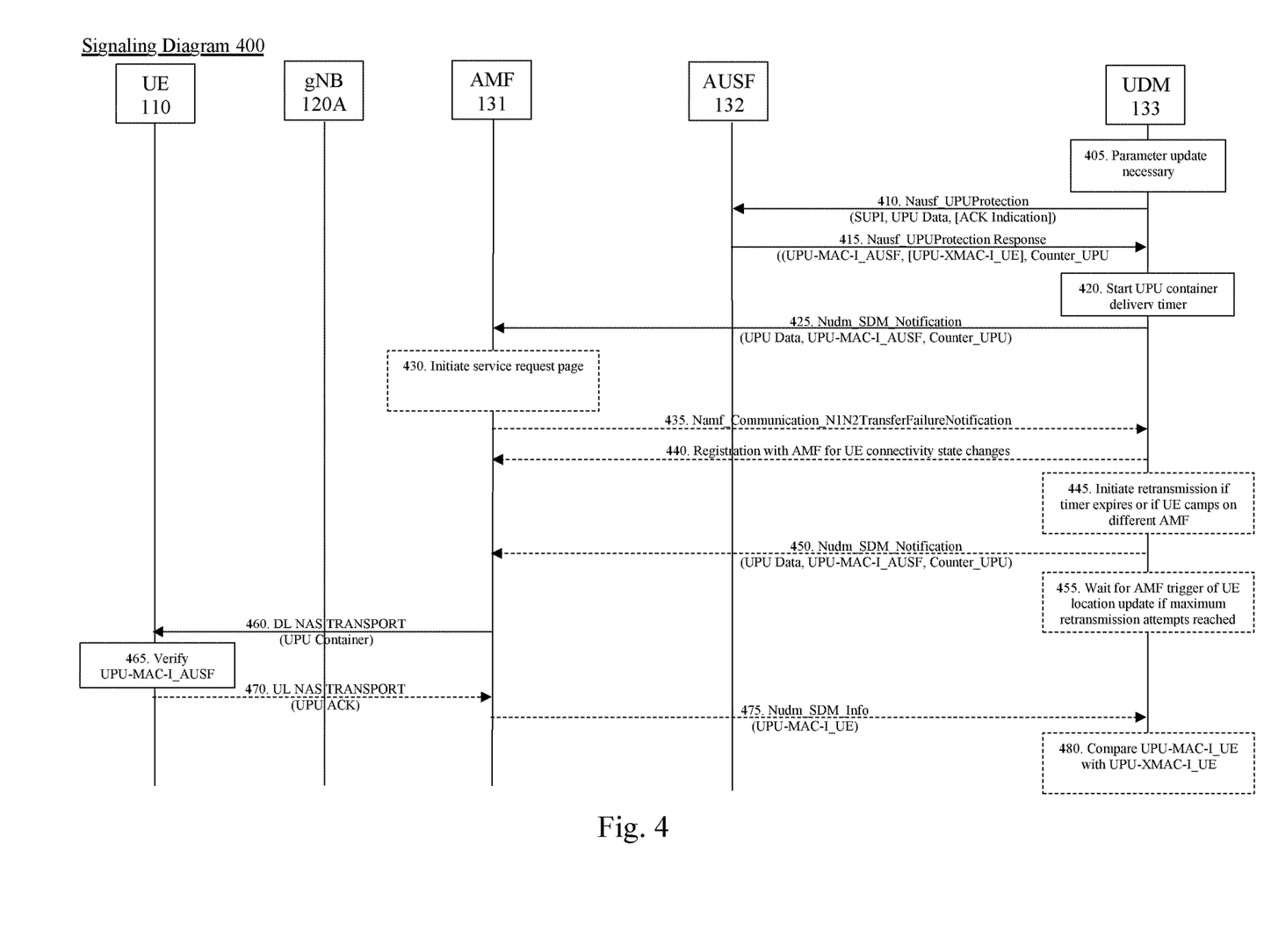
FIG. 4 is a signaling diagram illustrating a UPU procedure according to various exemplary embodiments.

FIG. 4 is a signaling diagram 400 illustrating a UPU procedure according to various exemplary embodiments. Because 405-415 are identical to 305-315 and 460-480 are identical to 350-370, a description of 405-415 and 460-480 will be omitted here for brevity. At 420, the UDM 133 starts a timer to track delivery of the UPU container to the UE 110. Similar to 325 discussed above, at 425, the UDM 133 notifies the AMF 131 of the changes to the parameters using the Nudm_SDM_Notification.

In some embodiments, if the AMF 131 is unable to communicate with the UE 110, then, at 430, the AMF 131 may attempt to initiate a network-triggered service request procedure by paging the UE 110. If, however, the UE 110 is not reachable, then the AMF 131, at 435, notifies the UDM 133 that transmission of the UPU container has failed. In such a case, at 440, the UDM 133 may register with the AMF 131 to be notified of any UE connectivity state changes such that if the UE 110 reconnects with the network, then the UDM 133 will be notified and will re-initiate the UPU procedure. Alternatively, if the UE 110 triggers registration on a new AMF, then the UDM 133 triggers transmission of the UPU container to the UE 110 using the same Counter_UPU after completion of the REG REQUEST procedure.

If the UDM 133 does not receive a failure notification from the AMF 131 and if, at 445, the UDM 133 determines that the timer has expired or that the UE 110 has camped on a new AMF, then, at 450, the UDM 133 initiates a retransmission of the UPU container (Nudm_SDM_Notification). If, at 455, the UDM 133 determines that the number of retransmissions is equal to a predetermined maximum number of retransmissions and an ACK still has not been received from the UE 110, then the UDM 133 then UDM waits for a trigger from the AMF 131 to update the UE location, which will then trigger the UPU procedure. For the routing indicator change case, until such a trigger is received from the AMF 131, the UDM 133 will grant access to the UE subscription context to both the old UDM instance and the new UDM instance. For the default configured slices case, the serving UDM instance keeps the procedure pending until the AMF 131 fetches UE subscription context or the AMF 131 updates the UE 110 location to UDM 133.

For the routing indicator change case, if the AMF 131 is unable to communicate with the UE 110 and the UPU container is not transmitted to the UE 110 due to, for example, a RLF, then in some embodiments, then both old and new UDM and AUSF instances have access to the subscription context of the UE 110 and the UPU procedure is considered pending. For the default configured slices case, the serving UDM instance keeps the procedure pending until the AMF 131 fetches the UE subscription context or the AMF 131 updates the UE 110 location to the UDM 133.

If, after verifying the UPU-MAC-I_AUSF at 465, the UE 110 is unable to transmit the ACK due to, for example, a RLF, the UDM 133 is unaware if the UE 110 received the UPU container and/or successfully processed the UPU. In some embodiments, for a routing indicator change, the UE 110 may send the new routing indicator with a SUCI to the AMF 131, which in turn will select the new AUSF instance and new UDM instance to fetch the UE's subscription context. As a result, the new UDM instance requests that the old UDM instance delete access to the UE's subscription context. For a default configured NSSAI, the UDM 133 treats the UPU procedure as pending. If the new routing indicator indicates default access, then there is no need to maintain access of UE's subscription context in both the old and new UDM instances.

In some embodiments, if the UE 110 registers on a new AMF and, as part of the registration procedure, the new AMF contacts the UDM 133 for the UE's information, the UDM may trigger any pending UPU procedure. In some embodiments, if the UDM 133 receives a trigger to update the location (Nudm_UECM_Registration) of the UE 110, then the UDM 133 stops any pending retransmission of the UPU container and re-initiates the UPU procedure by requesting AUSF 132 protection of the UPU data using a freshly generated K_AUSF using—Nausf_UPUProtection and the re-initialized CounterUPU value.

Figure 5:
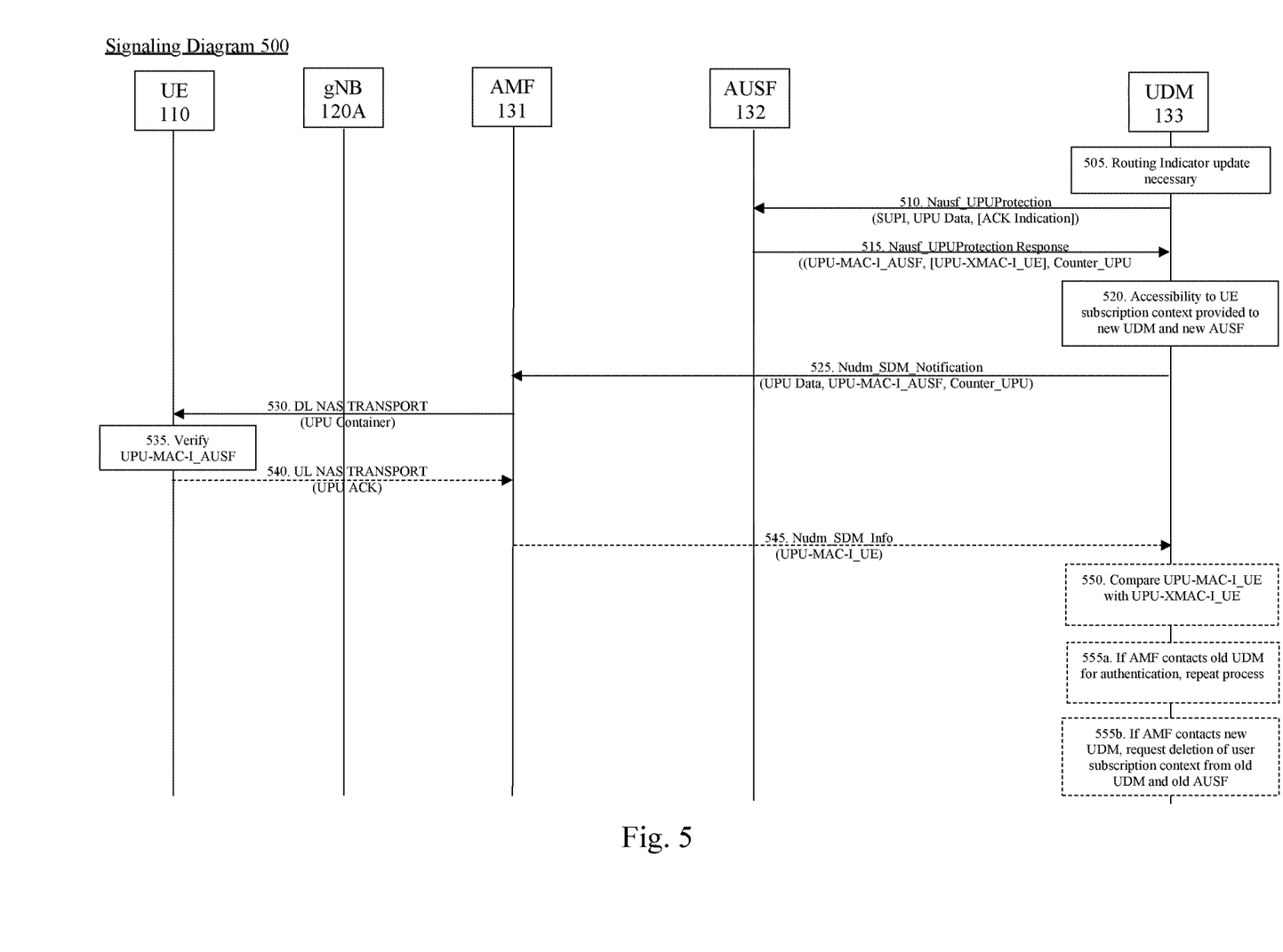
FIG. 5 is a signaling diagram illustrating a routing indicator update procedure according to various exemplary embodiments.

FIG. 5 is a signaling diagram 500 illustrating a routing indicator update procedure according to various exemplary embodiments. At 505, the UDM 133 determines that a routing indicator update should be performed at the UE 110. Because 510-515 are identical to 310-315 and 530-550 are identical to 350-370, a description of 505-515 and 530-550 will be omitted here for brevity. At 520, accessibility to the UE's subscription context is provided to the new UDM instance and the new AUSF instance such that both the old and new UDM and AUSF instances maintain accessibility to the UE's subscription context. Similar to 325 discussed above, at 525, the UDM 133 notifies the AMF 131 of the changes to the routing indicator by means of the Nudm_SDM_Notification.

If the serving AMF contacts the old UDM instance for authentication, then at 555a, the UDM 133 determines that 510-550 are repeated using the new security context (e.g., the new K_AUSF) and Counter_UPU. However, if the serving AMF contacts the new UDM instance, then, at 555b, the new UDM instance requests the deletion of the UE subscription context from the old UDM instance and the old AUSF instance.

If, after verifying the UPU-MAC-I_AUSF at 465, the UE 110 is unable to transmit the ACK due to, for example, a RLF, the UDM 133 is unaware if the UE 110 received the UPU container and/or successfully processed the UPU. In some embodiments, for a routing indicator change, the UE 110 may send the new routing indicator with a SUCI to the AMF, which in turn will select the new AUSF instance and new UDM instance to fetch the UE's subscription context. As a result, the new UDM instance requests that the old UDM instance delete access to the UE's subscription context.

Figure 6:
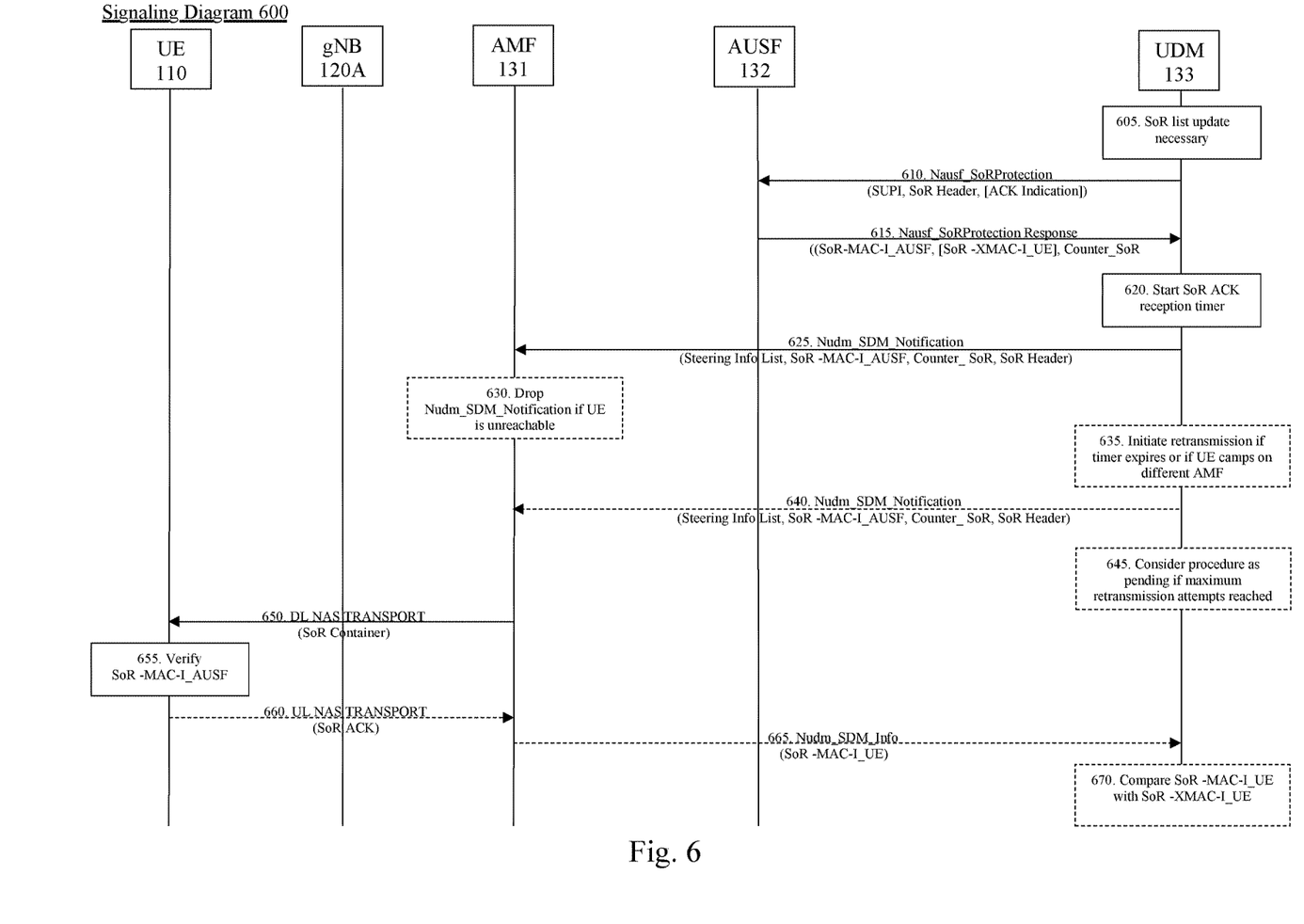
FIG. 6 is a signaling diagram illustrating a steering of roaming (SoR) list update procedure according to various exemplary embodiments.

FIG. 6 is a signaling diagram 600 illustrating a steering of roaming (SoR) list update procedure according to various exemplary embodiments. At 605, the UDM 133 determines that a SoR list update is necessary. In some embodiments, the SoR list update updates the list of operator controlled PLMNs with access technology stored on the UE 110. At 610, the UDM 133 transmits the SoR data to the AUSF 132 along with the SUPI and an indication of whether or not an acknowledgement (ACK) is requested from the UE 110. For purposes of this description, it will be assumed that the UDM 133 is requesting an ACK. However, it should be noted that in some embodiments, an ACK is not necessary. At 615, the AUSF 132 sends a response to the UDM 133 containing the SoR-MAC-I_AUSF, the SoR-XMAC-I_UE, and the Counter_SoR.

At 620, the UDM 133 starts a timer to track reception of the SoR ACK. If the timer expires before the UDM 133 receives the ACK, then the UDM 133 reattempts the SoR update procedure. In some embodiments, if the UDM 133 detects a change of AMF (e.g., the UE 110 initiates a registration request on a new AMF) while the SoR update procedure is ongoing, then the UDM 133 can initiate the SoR update procedure as part of a registration request procedure, after the AMF 131 fetches the UE subscription information from the UDM 133, after the completion of the registration request procedure or after the AMF 131 notifies the UDM 133 of the updated location of the UE 110.

At 625, the UDM 133 notifies the AMF 131 of the changes to the parameters by the means of the Nudm_SDM_Notification. This operation includes the updated SoR list as well as an indication of whether or not the UE needs to send an ACK. If the AMF 131 is unable to communicate with the UE 110, then, at 630, the AMF 131 drops the Nudm_SDM_Notification. If, at 635, the UDM 133 determines that the timer has expired or that the UE 110 has camped on a new AMF, then, at 640, the UDM 133 initiates a retransmission of the SoR container (Nudm_SDM_Notification). If, at 645, the UDM 133 determines that the number of retransmissions is equal to a predetermined maximum number of retransmissions and an ACK still has not been received from the UE 110, then the UDM 133 treats the SoR update procedure as pending until the serving AMF contacts the UDM 133 to update the location of the UE 110.

If the AMF 131 is able to communicate with the UE 110, however, the AMF 131 sends a DL NAS TRANSPORT message containing the UPU container to the UE 110 at 650. It should be noted that this message may be sent following 625 (the original transmission of the SoR container) or 640 (a retransmission of the SoR container) if the AMF 131 is able to communicate with the UE 110. At 655, the UE 110 verifies the SoR-MAC-I-AUSF according to 3GPP specifications by comparing the Counter_SoR to a Counter_SoR previously received to confirm that the SoR container is from the HPLMN. If the received Counter_SoR value is the same as the stored value on the UE 110 and an ACK is requested, the UE 110 sends an ACK in 660 to the network after integrity protecting the ACK as per the 3GPP specifications and including the SoR-MAC-IUE in the UL NAS TRANSPORT. The UE 110 will not further process the SoR container. If the received Counter_SoR value is the same as the stored value on the UE 110 and an ACK is not requested, the UE 110 does not process the SoR container further and does not send an ACK.

If the received Counter_SoR is different and of a higher value than the one maintained at UE 110, the UE 110 will process the SoR container as per the 3GPP specifications. For example, the UE 110 will compute the SoR-MAC-IAUSF and this is compared with the received value from network. If it is same, then the UE 110 further goes ahead with processing the SoR container and sends an ACK, if requested, in 660.

At 665, the AMF 131 sends a Nudm_SDM_Info message containing the SoR-MAC-I_UE to the UDM 133. At 670, the UDM 133 compares the SoR-MAC-I_UE received from the AMF 131 at 665 with the SoR-XMAC-I_UE received from the AUSF 132 at 615. If the SoR-MAC-I_UE and the SoR-XMAC-I_UE are the same, then the UDM 133 treats the SoR procedure as successfully completed.

If, after verifying the SoR-MAC-I_AUSF at 655, the UE 110 is unable to transmit the ACK due to, for example, a RLF, the UDM 133 is unaware if the UE 110 received the SoR container and/or successfully processed the SoR update. In some embodiments, the UDM 133 initiates a retransmission of the SoR container (Nudm_SDM_Notification) as described above at 635. If, the SoR container is received and processed by the UE 110 and the UE 110 subsequently receives a retransmission of the SoR container having the same Counter_SoR, the UE 110 may send the ACK, as described above, without processing the SoR container of the retransmission.

In some embodiments, if in between the retransmissions (640) or after it is determined that the UE 110 is not reachable, the serving AMF contacts the UDM 133 to update the location of the UE 110, then the UDM 133 may reinitiate the pending SoR procedure during or after completion of the registration procedure. In some embodiments, the SoR container may be included in the registration accept message sent to the UE 110. In some embodiments, if UDM 133 is notified by the serving AMF of a change in the location of the UE 110 (Nudm_UECM_Registration) and the registration procedure is successful, then the UDM 133 instance stops any pending retransmissions of the SoR container (640) and requests the AUSF 132 to provide the integrity protection parameters (e.g., the MAC-I and the Counter_SoR) newly based on the freshly generated K_AUSF and re-initialized Counter_SoR value.

Figure 7:
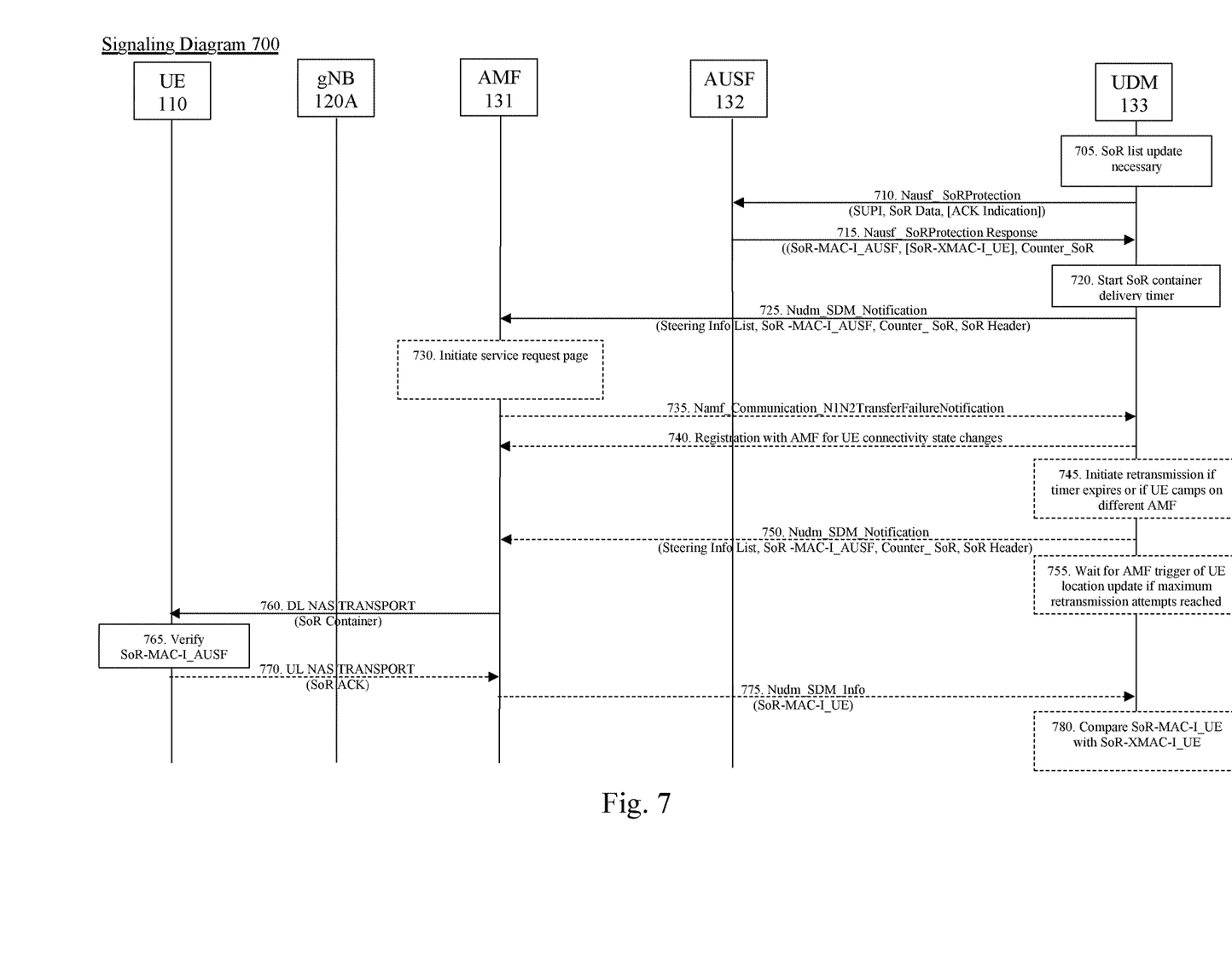
FIG. 7 is a signaling diagram illustrating a SoR list update procedure according to various exemplary embodiments.

FIG. 7 is a signaling diagram 700 illustrating a SoR list update procedure according to various exemplary embodiments. Because 705-715 are identical to 605-615 and 760-780 are identical to 650-670, a description of 705-715 and 760-780 will be omitted here for brevity. At 720, the UDM 133 starts a timer to track delivery of the SoR container to the UE 110. Similar to 625 discussed above, at 625, the UDM 133 notifies the AMF 131 of the changes to the SoR list by means of the Nudm_SDM_Notification.

In some embodiments, if the AMF 131 is unable to communicate with the UE 110, then, at 730, the AMF 131 may attempt to initiate a network-triggered service request procedure by paging the UE 110. If, however, the UE 110 is not reachable, then the AMF 131, at 735, notifies the UDM 133 that transmission of the SoR container has failed. In such a case, at 740, the UDM 133 may register with the AMF 131 to be notified of any UE connectivity state changes such that if the UE 110 reconnects with the network, then the UDM 133 will be notified and will re-initiate the SoR procedure. Alternatively, if the UE 110 triggers registration on a new AMF, then the UDM 133 re-initiates the SoR procedure using the same Counter_SoR during or after completion of the registration procedure.

If the UDM 133 does not receive a failure notification from the AMF 131 and if, at 745, the UDM 133 determines that the timer has expired or that the UE 110 has camped on a new AMF, then, at 750, the UDM 133 initiates a retransmission of the SoR container (Nudm_SDM_Notification). If, at 755, the UDM 133 determines that the number of retransmissions is equal to a predetermined maximum number of retransmissions and an ACK still has not been received from the UE 110, then the UDM 133 waits for a trigger from the AMF 131 to update the UE 110 location or fetch the subscription information for the UE 110, which will then trigger the SoR procedure.

If, after verifying the UPU-MAC-I_AUSF at 765, the UE 110 is unable to transmit the ACK due to, for example, a RLF, the UDM 133 is unaware if the UE 110 received the SoR container and/or successfully processed the SoR update. In some embodiments, the UDM 133 treats the SoR update procedure as pending.

In some embodiments, if the UE 110 registers on a new AMF and, as part of the registration procedure, the new AMF contacts the UDM 133 for the UE's information, the UDM may trigger any pending SoR procedure. In some embodiments, if the UDM 133 receives a trigger to update the location (Nudm_UECM_Registration) of the UE 110, then the UDM 133 stops any pending retransmission of the SoR container and requests the AUSF 132 to provide the integrity protection parameters (e.g., the MAC-I and the Counter_SoR) newly based on the freshly generated K_AUSF and re-initialized Counter_SoR value.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, ARM based microprocessors, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A network component implementing a unified data management (UDM) function of a core network, comprising:
one or more processors configured to perform operations comprising:
initiating a user equipment (UE) parameter update for a routing indicator update, the routing indicator update comprising updating an old routing indicator being used by the UE to a new routing indicator, wherein the old routing indicator is associated with an old unified data management (UDM) instance and an old authentication server function (AUSF) instance and the new routing indicator is associated with a new UDM instance and a new AUSF instance;

sending a transmission including an indication of the UE parameter update to an access and mobility management function (AMF) of the core network;

receiving an indication from the AMF that the UE is not reachable; and setting a status of the routing indicator update to pending in response to the indication from the AMF that the UE is not reachable.

2. The network component of claim 1, wherein the operations further comprise:

protecting the new routing indicator, wherein protecting the new routing indicator includes determining a UE parameter update (UPU) counter based on an AUSF key;

granting access to UE subscription information to the new UDM instance and the new AUSF instance by the old UDM instance and the old AUSF instance, wherein the AMF contacts the new UDM instance to obtain the UE subscription information or to update a location of the UE, requesting deletion of the UE subscription information on the old UDM instance and the old AUSF instance or access of UE subscription information from the old UDM instance and the old AUSF instance.

3. The network component of claim 2, wherein contact by the AMF to the new UDM indicates to the core network that routing indicator change procedure has been successfully completed.

4. The network component of claim 2, wherein the operations further comprise:

repeating the routing indicator change procedure if the AMF contacts the old UDM instance to obtain the UE subscription information or to update the location of the UE.

5. The network component of claim 4, wherein the old UDM instance repeats the routing indicator procedure using same UPU parameter counter in the transmission.

6. The network component of claim 4, wherein the old UDM instance repeats the routing indicator procedure using a new UPU counter.

7. The network component of claim 1, wherein the operations further comprise:

protecting the new routing indicator, wherein protecting the new routing indicator includes determining a UE parameter update (UPU) counter based on an AUSF key;

granting access to UE subscription information to the new UDM instance and the new AUSF instance by the old UDM instance and the old AUSF instance, wherein the AMF contacts the new UDM instance to obtain the UE subscription information or to update a location of the UE, requesting deletion of the UE subscription information on the old UDM instance and the old AUSF instance or access of UE subscription information from the old UDM instance and the old AUSF instance.

8. The network component of claim 7, wherein contact by the AMF to the new UDM indicates to the core network that routing indicator change procedure has been successfully completed.

9. The network component of claim 7, wherein the operations further comprise:

repeating the routing indicator change procedure if the AMF contacts the old UDM instance to obtain the UE subscription information or to update the location of the UE.

10. The network component of claim 9, wherein the old UDM instance repeats the routing indicator procedure using same UPU parameter counter in the transmission.

11. The network component of claim 9, wherein the old UDM instance repeats the routing indicator procedure using a new UPU counter.

12. A computer readable storage medium comprising a set of instructions that when executed by a processor of a unified data management (UDM) function of a core network causes the processor to perform operations, comprising:

initiating a user equipment (UE) parameter update for a routing indicator update, the routing indicator update comprising updating an old routing indicator being used by the UE to a new routing indicator, wherein the old routing indicator is associated with an old unified data management (UDM) instance and an old authentication server function (AUSF) instance and the new routing indicator is associated with a new UDM instance and a new AUSF instance;

sending a transmission including an indication of the UE parameter update to an access and mobility management function (AMF) of the core network;

receiving an indication from the AMF that the UE is not reachable; and setting a status of the UE parameter update to pending in response to the indication from the AMF that the UE is not reachable.

13. The computer readable storage medium of claim 12, wherein the operations further comprise:

protecting the new routing indicator, wherein protecting the new routing indicator includes determining a UE parameter update (UPU) counter based on an AUSF key;

granting access to UE subscription information to the new UDM instance and the new AUSF instance by the old UDM instance and the old AUSF instance, wherein the AMF contacts the new UDM instance to obtain the UE subscription information or to update a location of the UE, requesting deletion of the UE subscription information on the old UDM instance and the old AUSF instance or access of UE subscription information from the old UDM instance and the old AUSF instance.

14. The computer readable storage medium of claim 13, wherein contact by the AMF to the new UDM indicates to the core network that routing indicator change procedure has been successfully completed.

15. The computer readable storage medium of claim 13, wherein the operations further comprise:

repeating the routing indicator change procedure if the AMF contacts the old UDM instance to obtain the UE subscription information or to update the location of the UE.

16. The computer readable storage medium of claim 15, wherein the old UDM instance repeats the routing indicator procedure using same UPU parameter counter in the transmission.

17. The computer readable storage medium of claim 15, wherein the old UDM instance repeats the routing indicator procedure using a new UPU counter.

18. One or more processors of a unified data management (UDM) function of a core network configured to perform operations, the operations comprising:

initiating a user equipment (UE) parameter update for a routing indicator update, the routing indicator update comprising updating an old routing indicator being used by the UE to a new routing indicator, wherein the old routing indicator is associated with an old unified data management (UDM) instance and an old authentication server function (AUSF) instance and the new routing indicator is associated with a new UDM instance and a new AUSF instance;

sending a transmission including an indication of the UE parameter update to an access and mobility management function (AMF) of the core network;

receiving an indication from the AMF that the UE is not reachable; and setting a status of the UE parameter update to pending in response to the indication from the AMF that the UE is not reachable.

\* \* \* \* \*